(12) United States Patent
Candan et al.

(10) Patent No.: US 6,549,896 B1
(45) Date of Patent: Apr. 15, 2003

(54) SYSTEM AND METHOD EMPLOYING RANDOM WALKS FOR MINING WEB PAGE ASSOCIATIONS AND USAGE TO OPTIMIZE USER-ORIENTED WEB PAGE REFRESH AND PRE-FETCH SCHEDULING

(75) Inventors: Kasim Selcuk Candan, Mountain View, CA (US); Wen-Syan Li, Fremont, CA (US)

(73) Assignee: NEC USA, Inc., Princeton, NJ (US)

( * ) Notice: Subject to any disclaimer, the term of this patent is extended or adjusted under 35 U.S.C. 154(b) by 281 days.

(21) Appl. No.: 09/710,524

(22) Filed: Nov. 9, 2000

Related U.S. Application Data

(60) Provisional application No. 60/195,640, filed on Apr. 7, 2000.

(51) Int. Cl.[7] .............................................. G06F 17/30
(52) U.S. Cl. ........................................... 707/2; 707/10
(58) Field of Search ..................... 707/1, 2, 10; 709/217

(56) References Cited

U.S. PATENT DOCUMENTS

| | | | | |
|---|---|---|---|---|
| 6,098,064 A | * | 8/2000 | Pirolli et al. ................... 707/2 |
| 6,275,858 B1 | * | 8/2001 | Bates et al. ................. 709/228 |
| 6,418,433 B1 | * | 7/2002 | Chakrabarti et al. ........... 707/5 |
| 6,446,061 B1 | * | 9/2002 | Doerre et al. ................... 707/3 |

OTHER PUBLICATIONS

Chakrabarti et al. Mining the Web's Link Structure, Aug. 1999, Computer, vol. 32, No. 8, pp. 60–67.*

* cited by examiner

Primary Examiner—Jack Choules
(74) Attorney, Agent, or Firm—Foley & Lardner

(57) ABSTRACT

A method for estimating an association between the media objects and the seed Web page accessed by a user. The method is employed in the context of a Web space on a network having Web pages and links between those Web pages modeled as a directed graph. Each Web page comprises a set of media objects and a page author. For each object a size, a user preference and a page author preference are determined. The network has an available pre-fetch bandwidth. The method calculates a weight for each Web object by applying preference rules defined by and user preference and page author preference to the contents of the set of media objects. Next, a random walk graph is generated, and object gains are calculated by finding a steady state distribution of the random walk graph. The object gain represents an association between the object and the seed Web page.

42 Claims, 5 Drawing Sheets

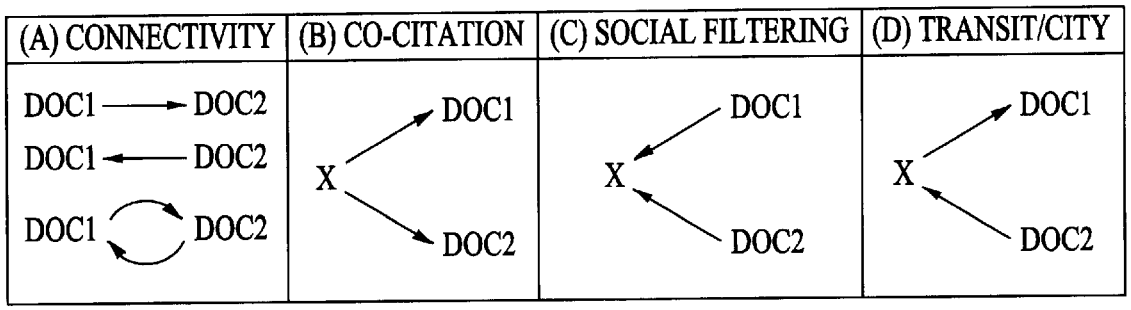
*fig.5*
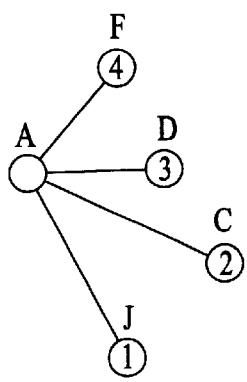      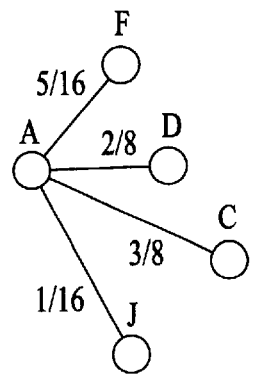
*fig.6A*      *fig.6B*

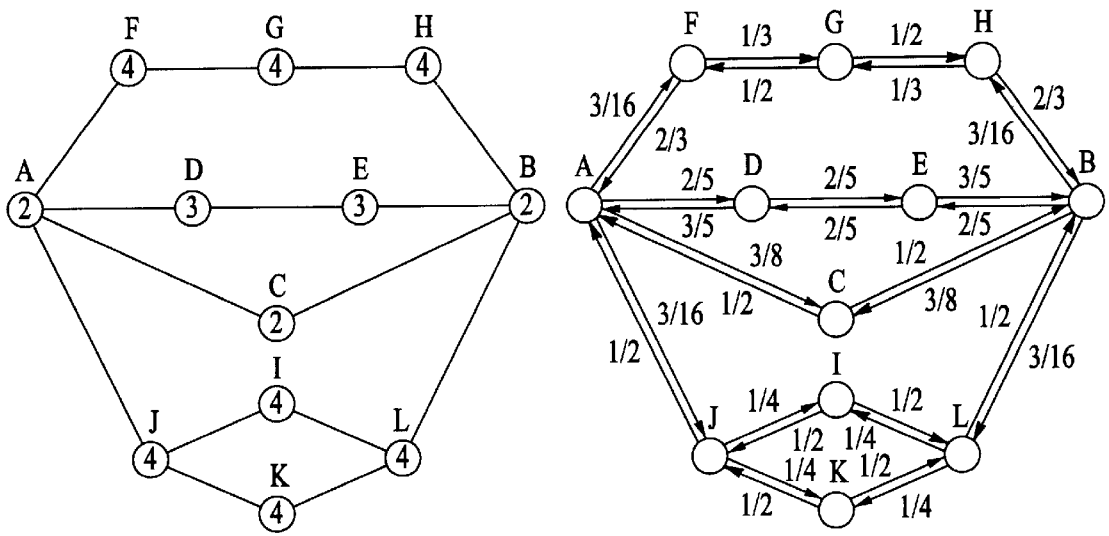

SYSTEM AND METHOD EMPLOYING RANDOM WALKS FOR MINING WEB PAGE ASSOCIATIONS AND USAGE TO OPTIMIZE USER-ORIENTED WEB PAGE REFRESH AND PRE-FETCH SCHEDULING

CROSS-REFERENCE TO RELATED APPLICATIONS

Embodiments of the present invention claim priority from U.S. Provisional Application Serial No. 60/195,640 entitled "Random Walks for Mining the Web Page Associations and Usage in User-Oriented Web Page Refresh and Pre-Fetch Scheduling," filed Apr. 7, 2000. The content of this application is incorporated by reference herein.

BACKGROUND OF THE INVENTION

1. Field of the Invention

The present invention relates, generally, to content delivery networks and, in preferred embodiments, to systems and methods employing random walks for mining web page associations and usage (data mining), and to optimize user-oriented web page refresh and pre-fetch scheduling.

2. Description of the Related Art

Web performance is a key point of differentiation among content providers. Snafus and slowdowns with major Web sites demonstrate the difficulties companies face when trying to scale large Web traffic. As Internet backbone technologies develop, many innovations, such as quality of service management, have been used to improve network bandwidth and improve Web content retrieval time. These improvements to infrastructure, however, cannot solve traffic problems occurring at any one point in the Internet. For example, in FIG. 1, an end-user 10 in a network 12 in Japan wants to access a page in a content provider original Web site 14 in a network 16 in the U.S. The request will pass through several Internet Service Provider (ISP) gateways 18, 20, and 22 before it reaches the content provider original Web site 14. Because of gateway bottlenecks and other delay factors along the Internet paths between the end-user and the content provider original Web site 14, a content pre-fetching and refreshing methodology utilizing a proxy server on the end-user side of the gateways could provide faster response time.

FIG. 2 illustrates a typical Web content delivery and caching scheme 24 which includes a caching system 26 connected to multiple non-specific Web sites 28 and 30. The caching system 26 is comprised of a proxy server or cache server 32, and cache 34. It should be understood that the cache 34 may be proxy cache, edge cache, front end cache, reverse cache, and the like. Alternatively, the caching system 26 of FIG. 2 can be replaced by a content delivery services provider and mirror sites, which would be connected to Web sites that have entered into subscriber contracts with the content delivery services provider. These subscriber Web sites will deliver content to the content delivery services provider for mirroring, but will not necessarily notify the content delivery services provider when the content has changed.

In FIG. 2, when content is delivered from a Web site to cache 34, a header called a meta-description or meta-data is delivered along with the content. The meta-data may be a subset of the content, or it may indicate certain properties of the content. For example, the meta-data may contain a last-modified date, an estimate that the content will expire at a certain time, and an indication that the content is to expire immediately, or is not to be cached. After the content and meta-data are delivered, if storing the content in cache 34 is indicated by the meta-data, the content will be stored in cache 34.

When a user 36 (user 1) requests access to a page (e.g., index.html) from a Web site 28 (Web site 1), the Web browser of user 1 will first send a request to a domain name server (DNS) to find the Internet Protocol (IP) address corresponding to the domain name of Web site 1. If, as in the example of FIG. 2, a caching system 26 is employed, the Web browser may be directed to the proxy server 32 rather than Web site 1. The proxy server 32 will then determine if the requested content is in cache 34.

However, even though the requested content may be found in cache 34, it must be determined whether the content in cache 34 is fresh. This problem can be described as database synchronization. In other words, it is desirable for the cache 34 and Web site 1 to have content that is the same. As described above, however, subscriber Web sites may not notify the proxy server 32 when their content has changed. Thus, the proxy server 32 may examine the meta-data associated with the requested content stored in cache 34 to assist in determining if the content is fresh.

If the requested content is found in the cache 34 and the meta-data indicates that the estimated time for expiration has not yet occurred, some caching systems will simply deliver the content directly to user 1. However, more sophisticated caching systems may send a request to Web site 1 for information on when the desired content was last updated. If the content was updated since the last refresh into cache 34, the content currently in the cache 34 is outdated, and fresh content will be delivered into the cache 34 from Web site 1 before it is delivered to user 1. It should be understood, however, that this process of checking Web sites to determine if the content has changed will also increase bandwidth or system resource utilization.

Similarly, if the requested content is found in the cache 34 but the content was set to expire immediately, some caching systems will simply fetch the content from Web site 1 and deliver it to user 1. However, if the end-user requests a validation of data freshness, some caching systems may send a request to Web site 1 for information on when the desired content was last updated. If the content was last updated prior to the last refresh into cache 34, the content is still fresh and the caching system will deliver the content to user 1, notwithstanding the "expired immediately" status of the content.

If the requested content is not in the cache 34, the proxy server 32 will send the request to Web site 1 to fetch the text of the desired Web page (e.g., index.html). After user 1's Web browser receives index.html, the browser will parse the html page and may issue additional requests to Web site 1 to fetch any embedded objects such as images or icons. However, if a caching system 26 is employed, the proxy server 32 will first determine if the embedded objects are available in the cache 34. All traffic (i.e., data flow) is recorded in a log file 38 in the proxy server 32. The log file 38 may include the IP addresses of the location from which requests are issued, the URLs of objects fetched, the time stamp of each action, and the like. Note that a proxy server 32 is usually shared by many end-users so that the content in the cache 34 can be accessed by end-users with similar interests. That is, if user 1 accesses a page and the page is stored in the cache 34, when another user 40 (user 2) requests the same page, the proxy server 32 can simply provide the content in the cache 34 to user 2.

In some caching systems a refresh may be performed even when there is no end user request for content. Without any user request being received, the cache will send a request to the Web site that delivered content into the cache to determine when the content in the Web site was last updated. If the content has changed, the content will be refreshed from the Web site back into cache. Thus, when a request for content is received from an end user, it is more likely that the content in cache will be fresh and transmitted directly back to the end user without further delay.

Network bandwidth resources and system resources are important for end users and proxy servers connected to the Internet. The end users and proxy servers can be considered to be "competing" with each other for bandwidth and connections resources, although their goals are the same—to provide users with the fastest response time.

FIG. 3 illustrates the connections available for a typical proxy server 42. The fastest response time for an individual request can be achieved when the requested content is located in the proxy server cache and is fresh, so that the proxy server 42 does not need to fetch the content from the Web site through the Internet. This situation is known as a cache "hit." System-wide, the fastest response times are achieved with a very high cache hit ratio. Thus, it would seem clear that more pre-fetching 44, refreshing, and pre-validation will lead to more fresh content, a higher cache hit ratio, and faster response times for an end user. However, there is a trade-off. To achieve a very high cache hit ratio, the proxy server 42 may need to utilize a high percentage of network bandwidth for content refreshing, pre-fetching, fetching, or pre-validation 44 into cache. Nevertheless, despite a large amount of refreshing, there will be occasions when an end user will request content that has not been refreshed into cache, or is simply not in the cache. In such a circumstance the proxy server 42 must issue a request fetch 46 to request the content from the Web site. However, if an excessive amount of bandwidth is currently being used to refresh other content, there may be insufficient bandwidth available for the cache to fetch the requested content from the Web site, and the response time of the content fetch may actually increase substantially. Thus, it should be understood that cache refreshing and pre-fetching competes with, and can be detrimental to, Web site content fetching.

Of course, if there is unused bandwidth at any moment in time, it makes sense to pre-fetch the highest priority content into cache so that it can be available for a requesting end user. For example, assume that 20% of the bandwidth is used for fetching content from a Web site when an end user requests the content and there is no cache hit. If 20% of the bandwidth is used for such fetches, then 80% of the bandwidth is unused. This unused bandwidth can be used to pre-fetch other content into cache so that when end users request that content it will be available to them. However, because only a percentage of the content stored in cache can be refreshed or pre-fetched due to network bandwidth limitations, a method for selecting the content to be refreshed or pre-fetched is desired.

Depending on the circumstances, the selection of which content to pre-fetch may not be a trivial task. In the simplest case, for example, assume that a single end-user is currently accessing a particular Web page in a Web site. Shortly, this end-user may navigate to another Web page. By pre-fetching those Web pages most likely to be navigated next, it may be possible to improve that end-user's response time. Because of the likelihood that the end-user will use a hyperlink on the current Web page to navigate to another Web page, it may make sense to pre-fetch Web pages according to the hyperlinks (link structure) found at the current location of an end-user. However, if two or more end-users are navigating one or more Web sites, and only a limited number of Web pages may be pre-fetched, the determination of which Web pages to pre-fetch becomes more difficult.

One way to determine the priority of Web pages to be pre-fetched is based on update frequency and query frequency. However, although the home page in a Web site may be queried more frequently than any other Web page, end-users currently navigating the Web site may not return to the home page for some time, and thus query frequency may not be the best determining factor in deciding which Web pages to pre-fetch. Furthermore, because end-users typically enter the Web site from the home page, the home page may already be available in cache. In addition, the update frequency of a Web page is not necessarily related to the likelihood that it will be accessed next, given the current location of end-users navigating a Web site.

The challenge of identifying a Web page that has a high probability of being accessed next can also be viewed as one of "associations" between Web pages. For example, two Web pages may be associated with each other because they both contain information about the stock market. Generally speaking, given the current location of an end-user, it is more likely than not that the next Web page to be accessed will somehow be associated with the current Web page. Thus, understanding something about the associations between Web pages may provide some insight in determining pre-fetching priorities.

When an author prepares a Web document, primary information is provided directly within the Web page, while related information on other Web pages is linked using anchors. In traditional information retrieval systems, the association between a given set of documents is determined by comparing keyword vectors that represent the content of the primary information provided directly within the Web page. These document associations are used for providing users with pages relevant to what they are currently viewing. However, such systems do not take link structure into consideration.

SUMMARY OF THE DISCLOSURE

Therefore, it is an advantage of embodiments of the present invention to provide a system and method employing random walks for mining web page associations and usage, and to optimize user-oriented web page refresh and pre-fetch scheduling that takes both link structure and Web page content into consideration.

It is a further advantage of embodiments of the present invention to provide a system and method employing random walks for mining web page associations and usage to optimize user-oriented web page refresh and pre-fetch scheduling that includes link analysis derived based on solving equations rather than using iteration-based methods.

It is a further advantage of embodiments of the present invention to provide a system and method employing random walks for mining web page associations and usage to optimize user-oriented web page refresh and pre-fetch scheduling that allows a set of Web pages to be specified to focus the reasoning.

These and other advantages are accomplished according to a method for estimating an association between the media objects and the seed Web page. The method is employed in the context of a Web space having a set of Web pages V and a set of links between those Web pages E modeled as a directed graph G(V,E). Each Web page $v_i \in V$ comprises a pair ($O_v$,$a_v$), where $O_v$ is a set of media objects (including a main HTML file) and $a_v$ is a page author. Each object $o \in O_v$ has a known size size(o), an end-user preference upref(u) for an end-user u, and a page author preference apref($a_v$) for a page author $a_v$. The Web space further includes an end-user u currently located at a seed Web page $v_c$ and an available pre-fetch bandwidth P.

The method first calculates a page preference weight pref(u,v) for each Web page $v_i$ by applying preference rules defined by upref(u) and apref($a_v$) to the contents of $O_v$, and calculates an object preference weight pref(u,o,v) for each object $o \in O_v$ by applying the preference rules defined by upref(u) and apref($a_v$) to the contents of $O_v$.

Next, a random walk graph is generated, and a page gain gain(u,v) is calculated by finding a steady state distribution (convergence vector) of the random walk graph. An object gain gain(u,o) is then calculated for each object as $$gain(u, o) = \sum_{o \in O_v} gain(u, v) \times pref(u, o, v),$$

wherein the object gain represents an association between the object and the seed Web page.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 5 illustrates different types of links.

FIG. 6(a) is a graph illustrating penalty values associated with some intermediate Web pages for moving between the two source pages in the example of FIG. 4, according to embodiments of the present invention.

FIG. 6(b) is a graph illustrating transition values associated with some intermediate Web pages for moving between the two source pages in the example of FIG. 4, according to embodiments of the present invention.

FIG. 7(a) is a graph illustrating the penalty values associated with all of the intermediate Web pages for moving between the two source pages in the example of FIG. 4, according to embodiments of the present invention.

FIG. 7(b) is a graph illustrating the transition values associated with all of the intermediate Web pages for moving between the two source pages in the example of FIG. 4, according to embodiments of the present invention.

FIG. 8(a) illustrates a transition matrix corresponding to the transition values shown in FIG. 7(b) according to embodiments of the present invention.

FIG. 8(b) illustrates convergence vectors corresponding to the transition matrix shown in FIG. 8(a) according to embodiments of the present invention.

DETAILED DESCRIPTION OF PREFERRED EMBODIMENTS

Figure 1:
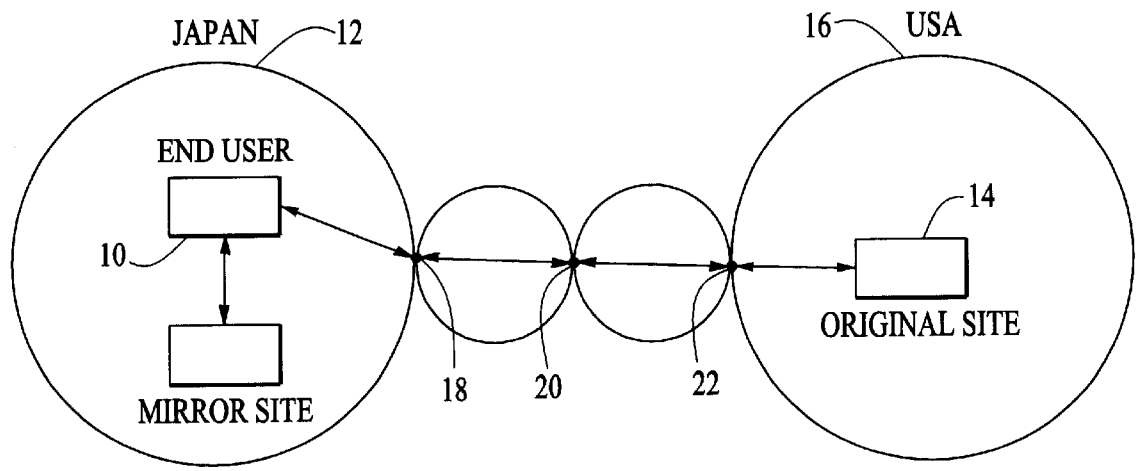
FIG. 1 is a block diagram illustrating an example of a conventional content delivery path between an end user and a web site.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Hypermedia has emerged as a primary mechanism for storing and structuring information. The World Wide Web is an example of a hypermedia environment. As the popularity of the Web increases, hypertext and hypermedia are being employed in a wide range of information systems, and are a major means for guiding end-users while they access and navigate through information from distributed sources.

Hypermedia includes both content and structural information. When an author prepares a Web document, primary information is provided directly within the Web page, while related information on other Web pages is linked using anchors. In traditional information retrieval systems, the association between a given set of documents is determined by comparing keyword vectors that represent the content of the primary information provided directly within the Web page. These document associations are used for providing users with pages relevant to what they are currently viewing. However, the reasons behind Web page associations are also implicitly embedded in the links connecting the Web pages, and thus link structures can also be used to derive Web page associations.

Web page associations may be useful for data mining, which is the process of discovering the relationships between two or more Web pages or Web sites. Data mining may be helpful to gain a competitive business advantage if relationships between competitors can be uncovered. For example, it may be useful in predicting the area of technology or technological capabilities of a new startup company if that company has a consultant, partner, or board member in common with a known, established company. In another example, the vulnerability of a company may be exposed if it can be determined that a company buys a critical part, or receives a critical service, from a single company that is having financial difficulties.

Web page associations may also be useful for pre-fetching or refreshing of content by mirror servers, proxy servers, end-user servers with caching capability, or the like. When a single end-user is navigating a Web site, the selection of which content to pre-fetch next may be based solely on the Web pages accessible through a fixed number of links from the current Web page (the source or seed page). However, when two or more seed pages are involved, as may be the case with multiple navigating end-users, the selection process can be much more complicated. In order to efficiently pre-fetch Web pages (assuming that there is a limit to how many Web pages may be pre-fetched), embodiments of the present invention select Web pages that have the highest association with all of the navigating end-users. In preferred embodiments, both link structure and content should be considered in identifying those Web pages.

First, associations based on link structure will be explored. When two or more seed pages are involved, embodiments of the present invention identify Web pages that are linked, either directly or indirectly through links in intermediate Web pages, to the seed pages. Once these Web pages are identified, the Web pages having the highest association with the seed pages currently being accessed are determined. These Web pages may be examined for purposes of data mining, or they may be pre-fetched or refreshed to improve end-user response times.

Figure 4:
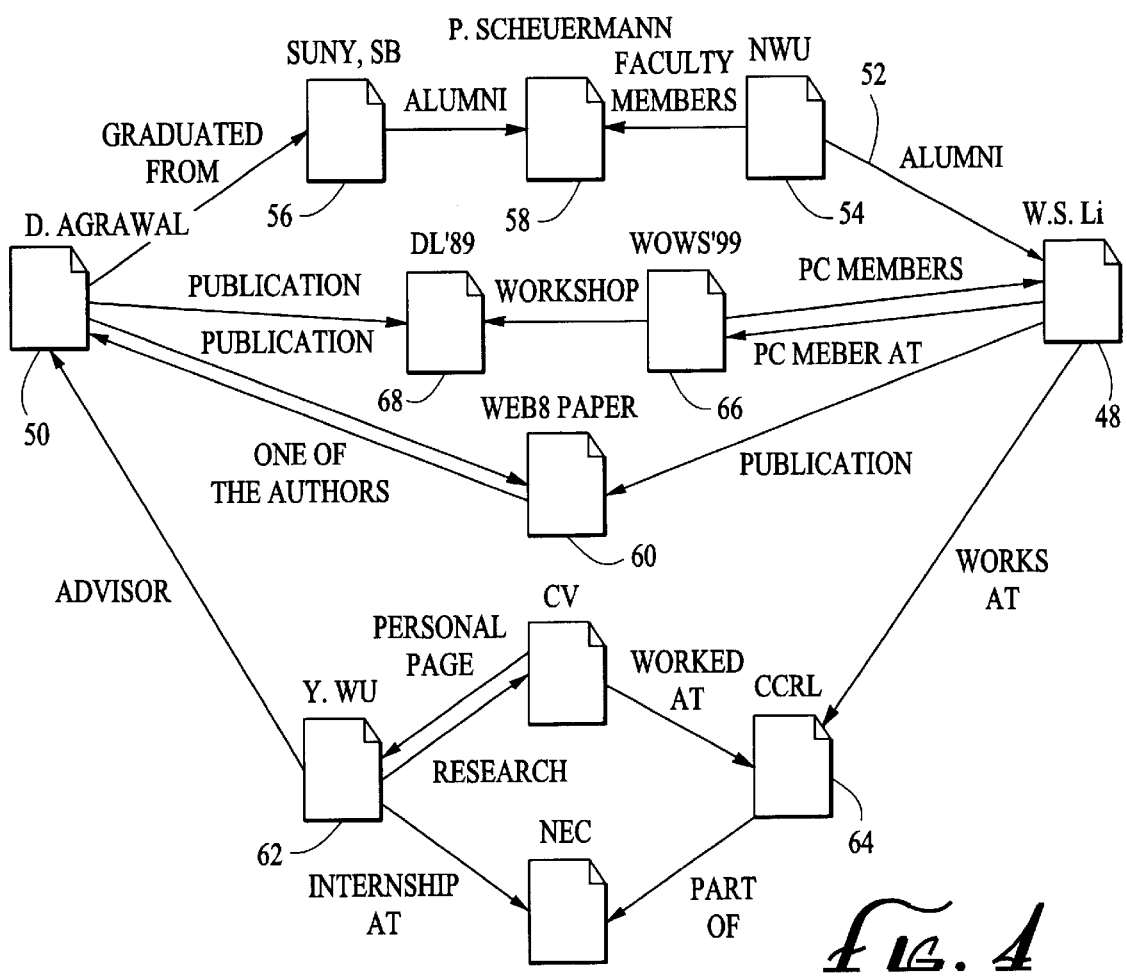
FIG. 4 is a graph illustrating an example link structure associating two source Web pages.

To identify the Web pages having the highest association with the seed pages, it is helpful to understand why the Web pages are associated. As example is illustrative. FIG. 4 illustrates a set of links between two Web pages W. S. Li 48 and D. Agrawal 50. These two Web pages can be considered the seed pages or nodes. The reason for each link's existence is indicated alongside the arrow representing the link. For example, W. S. Li graduated from Northwestern University (NWU), and thus there is a link 52 between a NWU Web page 54 and the W. S. Li Web page 48. Similarly, D. Agrawal and P. Scheuermann both graduated from the State University of New York, SB (SUNY, SB), and thus there is a link between the D. Agrawal Web page 50 and a SUNY, SB Web page 56, and a link between a P. Scheuermann Web page 58 and the SUNY, SB Web page 56.

Based on this link structure, if the association between the W. S. Li Web page 48 and the D. Agrawal Web page 50 is to be explored, the link structure connecting the W. S. Li Web page 48 and the D. Agrawal Web page 50 can provide useful clues for discovering the underlying relationship embedded in the links. Below, some of the reasons implicit in the link structure that may explain why the W. S. Li Web page 48 and the D. Agrawal Web page 50 are associated are enumerated. (To be accurate, the term discovery should be used for the relationships found, and the term reasons should be used for the validated relationships. However, for purposes of simplifying the discussion, the two terms are used interchangeably herein.)

Reason 1: A Web page containing a Web8 paper 60 appears in a path of distance of 2 connecting the W. S. Li Web page 48 and the D. Agrawal Web page 50. Therefore, W. S. Li and D. Agrawal may be associated due to a co-authored paper.

Reason 2: A Y. Wu Web page 62 is on two paths related to NEC Research Laboratories (CCRL) (see CCRL Web page 64), each of distance 4. W. S. Li and D. Agrawal may be associated due to the fact they both supervised Y. Wu at different occasions, or because they participated in the same project at NEC.

Reason 3: A WOWS '99 Web page 66 and a DL '99 Web page 68 appear on a single path of distance 3. W. Li and D. Agrawal may be associated due to the fact they both participated in the same conference (e.g. presentation or program committee members).

Reason 4: The P. Scheuermann, D. Agrawal, NWU, W. S. Li, and SUNY, SB Web pages appear on a single path of distance 4. Such a link relationship implies that D. Agrawal and W. Li may be associated due to common acquaintances at SUNY, SB, or due to an alumni relationship.

The above example shows that the following two intuitions, along with the actual content of the pages, can generally be used to identify why a given set of pages are associated:

A page that represents the association between input pages must be near them: For example, pages on a shorter path between the W. S. Li and D. Agrawal Web pages are stronger indicators than others to reflect why the W. S. Li and D. Agrawal pages are associated.

A structural representative must be highly connected to the given pages: Pages which appear on more paths should be stronger indicators than others to reflect why the W. S. Li and D. Agrawal pages are associated.

Note that a Web page with a higher connectivity (i.e. more incoming links and outgoing links) is more likely to be included in more paths. Consequently, such a page is more likely to be ranked higher, according to the above criteria. On the other hand, a page with high connectivity but far away from the seed pages may be less significant for understanding associations than a page with low connectivity that is close to the seed pages. A page which satisfies both of the above criteria (i.e. close to seed pages and having high connectivity) would be a good representative Web page for understanding the association between the two seed pages.

The distance between two Web pages can be defined in various ways. In the simplest case, the number of links between two pages can be used as the distance metric. On the other hand, in order to capture the physical as well as logical distances between pages, different distance metrics capable of capturing document contents of user interests may be utilized. For example, if the associations between W. S. Li and D. Agrawal with respect to NEC are to be understood, then the reasoning may need to be focused on NEC.

Based on the above intuitions, embodiments of the present invention provide a framework for reasoning associations among Web documents using information implicitly embedded in the links connecting them, as well as using the contents of these connecting documents. The reasoning scheme is based on a random walk algorithm.

Figure 2:
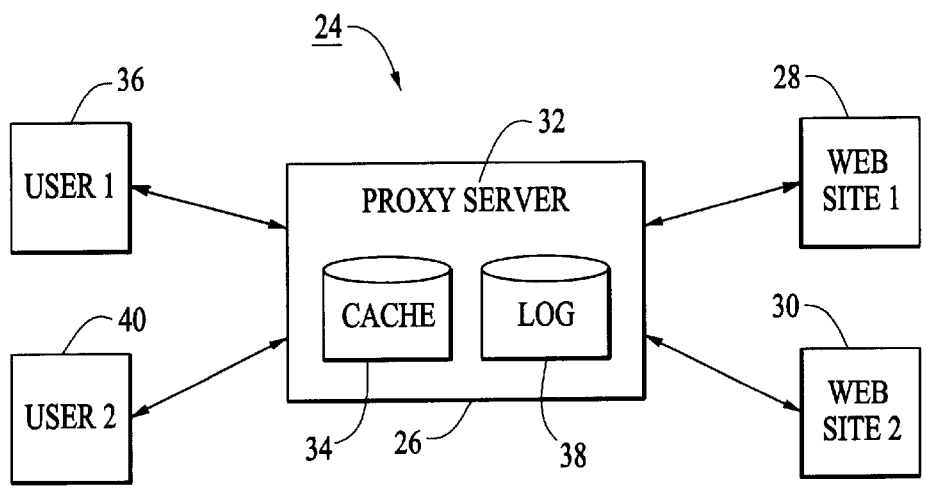
FIG. 2 is a block diagram illustrating an example of a conventional caching system.
Figure 3:
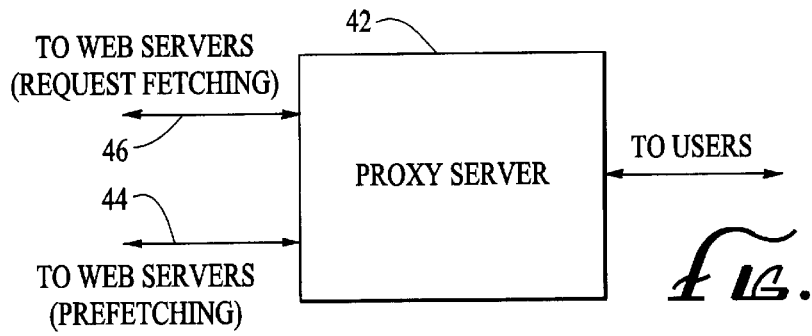
FIG. 3 is a block diagram illustrating an example of a typical connections available for a proxy server.

It should be noted that although, for purposes of simplifying the discussion, the following description of embodiments of the present invention are algorithmic in nature, the processes described below may be performed by one or more processors contained in one or more servers having accessibility to logs concerned with the storage of Web content within a memory such as cache, as illustrated in FIG. 2. The server may include, but is not limited to, proxy servers, cache servers, mirror servers, web-browser computers, and the like. The cache may include, but is not limited to, proxy cache, edge cache, front end cache, reverse cache, and the like. Alternatively, the caching system of FIG. 2 can be replaced by a content delivery services provider and mirror sites.

The Random Walk Algorithm for Reasoning Document Associations

The general concepts behind the random walk algorithm according to embodiments of the present invention will first be explained with reference to the example of FIG. 4. Given two starting points or seed pages, such as the D. Agrawal Web page 50 and the W. S. Li Web page 48, and assuming random navigation from those two starting points, the random walk algorithm produces a list of Web pages prioritized according to the time that the random walk process is likely to spend at each Web page during a random walk starting from one starting point (source page) to another.

As illustrated in the example of FIG. 4, the D. Agrawal Web page 50 and the W. S. Li Web page 48 (the two seed pages) are connected through multiple paths. In one path, there are just two links and one Web page (the Web page containing the Web8 paper 60) separating the two Web pages. In other paths, there may be multiple links and multiple Web pages separating the two Web pages. The random walk algorithm first assigns those Web pages that connect the D. Agrawal Web page 50 and the W. S. Li Web page 48 in a fewer number of links (e.g. the Web page containing the Web8 paper 60 in FIG. 4) a lower penalty, because the random walk process is likely to spend the most time at those Web pages. Conversely, those Web pages that connect the seed pages in a higher number of links (e.g. the P. Scheuermann Web page 58) are assigned a higher penalty.

Next, for each Web page having one or more links to other Web pages, and given the assigned penalty value for the other Web pages, the probability that the random walk process will transition to each of the other Web pages is computed. This computation assumes that the penalty values of the other Web pages are inversely related to their transition probabilities.

Formal Model, Case 1: S contains Two Seed Pages

A more formal explanation of the random walk algorithm will now be provided. Assume that there is a desire to understand the associations of a set, $S=\{s_1, \ldots, s_n\}$ of seed Web pages (or snodes). The reasoning task is to find a set Ref(S), of pages that best induce (or reflect) the association among a given set of snodes. Such pages can be denoted as inductive Web pages (or inodes). For ease of presentation, assume the case where there are only two seed pages for association reasoning. (The case where S contains more than two pages is discussed infra.)

In embodiments of the present invention, the Web may be modeled as a directed graph, G(V,E), where the two seed pages in S, defined as snodes, correspond to vertices $v_a$ and $v_b$ in V. Assume that there is a desire to find an inode page (or vertex) within a radius of d from $V_a$ or vb. Note that the choice of d is application dependent. It can depend on the computation resource, or on a judgment as to whether it is meaningful to consider pages which are more than certain number of links away. If progressive results are required, d can be incremented starting from 1, refining the results at each step, until either the process times out or an acceptable inode is located.

Links have been used in many fields to associate documents. They can be categorized into four types, as illustrated in FIG. 5. For example, co-citation suggests that two documents are relevant to each other if they are linked via a common document. Social filtering suggests that two documents are relevant to each other if they link to a common document. All of the link types illustrated in FIG. 5 can be found in the real world Web environment, and it is difficult to judge what type of relationship is more important than others. Consequently, the random walk algorithm can be simplified by using only an undirected Web graph, G"(V,E"). Furthermore, assuming a radius d, in alternative embodiments of the present invention, a relevant neighborhood $G^N(V^N,E^N)$ of G"(V,E") can be defined as the set of vertices, $V^N=V_{G''}(v_a,v_b,d)$, that are reachable either from $v_a$ or $v_b$ in d edge traversals:

$$\forall v_i \in V_{G''}(v_a,v_b,d) \text{reachable}_{G''}(v_a,v_i,d) \vee \text{reachable}_{G''}(v_b,v_i,d).$$

Note that if there is no vertex $v_i \in V^N$, that is reachable from both $v_a$ and $v_b$, then the radius d is not large enough to contain an inode. Hence, without loss of generality, it will be assumed that there is at least one such vertex and consequently, the neighborhood graph, $G^N$, is connected.

To derive metrics for inode selection, one intuitive candidate metric that adjusts connectivity scores by distance would be $$score(v) = \sum_{p \in paths(A,B,v)} \frac{1}{length(p)},$$

where paths (A, B, v) is the set of (undirected simple) paths between the seeds, A and B, that pass through a candidate inode v, and length(p) is the length of the path p. Note, however, that although it merges the two required structural criteria of length and fanout, this metric has two main disadvantages preventing its use in reasoning associations.

First, its calculation may require the enumeration of all paths in the graph, which may (in the worst case) require exponential time with respect to the size of the graph. Although the maximum length of the paths grows linearly with the number of vertices in the graph, the number of paths grows exponentially. As a consequence, contrary to intuition, the effect of the long paths on the calculation of score(v) is likely to be much larger than the effect of short paths (because their number is exponentially higher than the number of shorter paths).

Second, a score function that works for one Web graph may not work well for others, because the score function is Web graph dependent. In other words, length(p) in the metric defined above may have an exponent that varies according to fanout (e.g. a commercial Web site may have high fanout as compared to an institutional Web site, and thus the score metric would be different in each case). Thus, ad hoc functions are not suitable metrics for inode selection.

Consequently, instead of explicitly defining a metric, embodiments of the present invention select a set of random walk parameters that will implicitly capture the essence of the above-described score function observations. In order to materialize the observations into an algorithm, a random walk graph will be defined and constructed that reflects the required random walk parameters.

Random Walk Graph

A random walk graph R(V,E,T) is a triple where

V is a set of vertices,

E is a set of directed edges, and

T is a $|V| \times |V|$ matrix where T[j,i] denotes the likelihood of moving to vertex $v_i$ from vertex $v_j$.

Note that $\Sigma_{1 \leq j \leq |V|} T[j,i] = 1.0$.

Given an undirected neighborhood graph $G^N(V^N,E^N)$, two seed vertices $v_a$ and $v_b$ in V, and a radius d, in embodiments of the present invention a directed random walk graph R($v_a$, $v_b$, d) (V,E,T) can be constructed using the algorithm presented below:

1. $V = \emptyset$;
2. For each $v_i \in V^N$, create a new $v_i'$ and insert it in V;
3. $E = \emptyset$;
4. For each $e_k = \langle v_i, v_j \rangle \in E^N$ such that both $v_i$ and $v_j$ are in $V^N$, create two directed edges $e'_{2 \times k} = \langle v_i', v_j' \rangle$ and $e'_{2 \times k+1} = \langle v_j', v_i' \rangle$ and insert them in E;
5. For all vertices $v_i' \in V$, let
   (a) sdist($v_i', v_a'$) be the shortest distance in $G^N$ between $v_i'$ and the vertex $v_a'$ corresponding to $v_a$, and
   (b) sdist($v_i', v_b'$) be the shortest distance in $G^N$ between $v_i'$ and the vertex $v_b'$ corresponding to $v_b$,
   (c) penalty($v_i'$) = sdist($v_i', v_a'$) + sdist($v_i', v_b'$)
   (d) for all vertices $v_i' \in V$ and for all $(v_i', v_j') \notin E$, T[j,i] = 0.0,
   (e) for all vertices $v_i' \in V$, solve the following set of linear equations:

$$L(v'_i) = \left\{ \sum_{(v'_i,v'_j) \in \varepsilon} T[j, i] = 1.0 \right\} \cup \{T[j, i] \times penalty(v'_j) =$$

$$T[k, i] \times penalty(v'_k) \mid (v'_i, v'_j) \in E \text{ and } (v'_i, v'_k) \in E\},$$

where
$L(v_i')$ is a set of linear constraints for each vertex $v_i'$.

Steps 1 and 2 of this algorithm insert the relevant vertices in the neighborhood into the random walk graph. Note that these two steps can be performed incrementally until a subgraph within a radius of d is explored. Steps 3 and 4 use the undirected edges in the neighborhood graph to define two transitions (forward and backward) between the vertices in the random walk graph. These two transitions allow the random walk to proceed freely, back and forth, between the neighboring vertices of the graph.

Step 5 then calculates a penalty for each node. This penalty term reflects the distance of each vertex from the seed vertices. Hence, for the case with two seeds, the penalty is defined as the sum of shortest path distances between the given vertex and two seed vertices. The penalty is used to calculate the likelihood of each vertex being visited by the random walk process. More specifically, the transition probabilities of the edges in the graph are calculated using this term.

Because a higher penalty means a greater distance from the seeds, it should yield a lower association score. Consequently, once the random walk process is at a vertex, $v_i$, it must proceed to a subsequent vertex, $V_j$, with a probability inversely proportional to the penalty of $v_j$. Furthermore, because the random walk will continue for an indefinite period of time, the probability that the random walk process will leave vertex $v_i$, (that is, it will proceed to one of its neighbors) must be equal to 1.0.

Continuing the previous example for purposes of illustration only, FIG. 6 illustrates the effect of the penalty term on transition probabilities, and demonstrates the workings of Step 5 in greater detail. For purposes of simplifying the discussion, FIG. 6(a) shows a portion of the present example, which depicts the vertex A, its four neighbors (vertices F, D, C, and J), and the associated penalties (4, 3, 2, and 4 respectively) calculated according to the distance metric. It should be understood that FIG. 6 corresponds to FIG. 4, and that the D. Agrawal Web page 50 corresponds to vertex A, the Web8 paper Web page 60 corresponds to vertex C, the DL '99 Web page 68 corresponds to vertex D, the SUNY, SB Web page 56 corresponds to vertex F, and the Y. Wu Web page 62 corresponds to vertex J.

FIG. 6(a) illustrates that there are four paths that can be taken from vertex A to the W. S. Li Web page (not shown in FIG. 6). The penalty values (the number of links between vertex A and the W. S. Li Web page) are relevant when randomly walking through the Web pages because, assuming random walks, it is more likely that Web pages in paths with fewer links will be accessed more frequently than Web pages in paths with a higher number of links. Each link can be assigned a probability or transition value based on its penalty value, as shown in FIG. 6(b).

The following items reflect some of the facts known about the transition probabilities of the edges that are leaving vertex A:

The sum of all such transition probabilities is equal to 1.0;

Because the penalty of the vertex F is twice as much as the penalty of vertex C, the transition probability from A to F must be half of the transition probability from A to C; and Because the penalty of the vertex D is 3/2 times as much as the penalty of vertex C, the transition probability from A to D must be 2/3 of the transition probability from A to C.

Hence, the transition values for the edges leaving the vertex A can be calculated using the following set of linear constraints (as described in Step 5(e) of the algorithm presented above):

$T[F,A]+T[D,A]+T[C,A]+T[J,A]=1.0$ $4 \times T[F,A]=3*T[D,A]$ $3 \times T[D,A]=2*T[C,A]$ $2 \times T[C,A]=4*T[J,A]$ $4 \times T[J,A]=4*T[F,A]$ $4 \times T[F,A]=2*T[C,A]$ $4 \times T[J,A]=3*T[D,A]$ Note that the above set of constraints is redundant (only first four equations are enough to solve for all the unknowns). FIG. 6(b) shows the transition values obtained through the solution of these linear constraints. There is a $3/16^{ths}$ probability that vertex J or F will be visited as the random walk algorithm leaves vertex A, a $3/8^{ths}$ probability that vertex C will be visited, and a $2/8^{ths}$ probability that vertex D will be visited.

According to embodiments of the present invention, once the edge transition probabilities that reflect the structural information are calculated, a convergence vector (or an eigenvector corresponding to the linear equations) can be used to identify the inodes. The convergence vector will now be described. Given a random walk graph $R(v_w)$ (V, E, T), t is a convergence vector of T, where $\Sigma_{1 \leq i \leq |v_w|} t[i]=1.0$ and t[i] represents the percentage of the time that a random walk process will spend in vertex v[i] in a sufficiently long random walk. Thus, t=Tt and (I–T)t=0, where I is a unit matrix.

Note that due to the structure of the transition matrix, such a convergence vector is guaranteed to exist. Intuitively, t[i] describes the percentage of the time that a random walk process will spend in vertex v[i] in a sufficiently long random walk. As described earlier, a higher value for t[i] indicates that the corresponding vertex v[i] is a better inode. Consequently, the inodes can be prioritized in order of their corresponding values in the convergence vector.

The vertex that best reflects the association between any two vertices (i.e. the highest t[i] value) is called the inode vertex, and is defined as follows: given a graph G(V,E), the inode vertex with respect to vertices $v_a$ and $v_b$, in G and a distance d, denoted as inode $_G(v_a,v_b,d)$, is a vertex $v_k \in V^N$ such that $t[k]=\max\{t[i] \mid v_i' \in V\}.$ It should be understood that if t[i]>t[j], then $v_i$ is deemed more dominant than $v_j$.

Continuing the previous example for purposes of illustration only, assume that FIG. 7(a) illustrates a graph, $G^u$, where each vertex $v_i$ is reachable from vertex A or B in two edges. Again, it should be understood that the vertices of FIG. 7 correspond to the Web pages of FIG. 4. The numbers shown in the vertices of the graph in FIG. 7(a) are the corresponding distance penalties of the vertices. These penalties will be used in determining the dominant vertex of the graph.

FIG. 7(b) illustrates the complete random walk graph, $R_{(A,B,2)}$, corresponding to the graph shown in FIG. 7(a). The transition values calculated using the vertex penalties are shown as labels on the edges. The corresponding transition matrix T is also shown in FIG. 8(a). As FIG. 8(a) illustrates, there are many vertices that are not directly connected, and therefore there is a zero probability of movement between those two vertices. This accounts for the zeros found in FIG. 8(a).

If the linear equation (I–T)t=0 (i.e. 12 variables and 13 constraints) is solved, the values for t can be computed as shown in FIG. 8(b). For example, Row A in FIG. 8(a) is used to compute the convergence vector in Row A of FIG. 8(b). As described above, the convergence vectors in FIG. 8(b) represent the fraction of time that the random walk process with spend at that particular vertex during a sufficiently long random walk. According to FIG. 8(b), excluding the vertices A and B themselves, the most dominant vertex is C. Vertices D and E follow C with lower dominance values as they are on a longer path between A and B. Note also that although vertices J and L have the same transition values as vertices F and H, they have a higher convergence vector value because J and L are on multiple paths (one involving vertex I and one involving vertex K), so the random walk process is more likely to spend more time at vertices J and L than F and H.

Although FIG. 8(b) was generated based on random walks, if an actual log of end-user requests is available, the probabilities can be modified based on the actual end-user request patterns. A graph as shown in FIG. 7(b) would be generated with probabilities based on actual usage. Another set of charts similar to those in FIG. 8 would then be generated.

In generating graphs for two known source pages, such as those in FIG. 7, forward links can be determined by looking at the web page and all of the links embedded in it. A search capable of locating backward links may be used to find the backward links. With these two types of information, a graph as illustrated in FIG. 7 can be created. Over time, a list of pages will be accumulated that are reachable from the source pages in one link, two links, etc. Eventually, a set of pages that are reachable by both source web pages mat be identified.

Case 2: S Contains More than Two Pages

In alternative embodiments of the present invention, the structural inode selection process may be extended to situations where there are more than two seed pages. In order to extend the algorithm presented in the previous section to the case in which S contains more than two seed pages, it should be noted that the algorithm uses these seed pages to discover the boundaries of the neighborhood, and to calculate the penalty of each vertex in the random walk graph.

The first of these tasks (discovering the boundaries of the neighborhood) may be generalized as follows: given a set of vertices $|S| \geq 2$ and a radius d, in alternative embodiments of the present invention the relevant neighborhood $G^N(V^N,E^N)$ of $G^u(V,E^u)$ is the set of vertices $V^N=V_{G^u}(S,d)$ that are reachable from the vertices in I in d edge traversals:

$$\forall v_१ \in V_{G^u}(S, d) \bigvee_{v_1 \in S} reachable_{G^u}(v_j, v_i, d).$$

Again, it can be assumed that there is at least one vertex $v_i \in V_{G^u}(S,d)$ that is reachable from all seed vertices. The reason for such a simplification is because it has been determined that Web pages which are further away from the source page tend to have less significance and are less likely to be accessed from the source page.

The second task, determining the penalty of each vertex, can be handled in two ways. In alternative embodiments of the present invention, the definition of a penalty can be generalized either as $$penalty(v_i') = \sum_{u_j \in S} sdist(v_i', v_j'),$$

or in preferred embodiments, the penalty may be defined as $$penalty(v_i')=length\ (minimum\_steiner\_tree\ (S \cup \{v_i'\})),$$

to get a more accurate picture of the distance of $v_i'$ from the seed vertices. Note that the problem of finding the minimum weighted connected subgraph, G', of a given graph G, such that G' includes all vertices in given subset R of G is known as the Steiner tree problem. (If it exists, G' is guaranteed to be a tree.) Note that the Steiner tree problem is well-understood by those skilled in the art (see, e.g., "The Steiner Tree Problem," Frank K. Hwang, Dana S. Richards, and Pawel Winter, editors, Annals of Discrete Mathematics, Vol. 53, 1992). Unfortunately, the minimum weight Steiner tree problem is known to be NP-hard; i.e., it is not known whether there exists a polynomial time solution. On the other hand, the penalty definition used in the algorithm, which is calculated as the sum of all relevant shortest paths, is known to require polynomial time, and consequently, it is a more efficient solution.

Case 3: Consideration of Focused Topics

The random walk algorithm presented above, according to embodiments of the present invention, used vertex-to-seed distance information to identify penalties used in transition probability calculations for the random walk. In order to incorporate document contents in the task of reasoning association, the definition of a penalty can be changed to also include document contents. The following discussion is an extension to the basic random walk algorithm which considers specific topic that users are interested in reasoning, which will be referred to herein as the Topic-Focused Random Walk Algorithm.

The Topic-Focused Random Walk Algorithm allows document associations to be reasoned with respect to not only seed URLs, but also a particular topic. For example, referring again to the previous example, there may be an interest in discovering why the W. S. Li Web page and the D. Agrawal Web page are associated with respect to NEC, or why the W. S. Li Web page and the D. Agrawal Web page are associated with respect to the P. Scheuermann Web page. To answer these questions, the pages related to NEC or the P. Scheuermann page would be assigned lower penalty values so that these pages would receive higher scores.

Assuming that there exists a function, relevance (v, topic), for measuring the relevance between the contents of a vertex v and a given topic, the adjustment for the topic-focused random walk algorithm is to redefine the penalty of a vertex as $$\frac{penalty(v)}{relevance(v, topic)}.$$

One way to quantify the relevance of a Web page as it pertains to a certain topic is to use standard search engine results. In other words, for a given topic, a search engine may identify a number of Web pages that contain the topic, and may even rank the Web pages according to how many times the topic was found within the Web page. Those web pages can be assigned a high relevance value. The overall size of the Web page may also be considered in quantifying relevance. For example, if the word "car" appears ten times in a very small Web page but appears eleven times in a very large Web page, the small Web page may be more relevant to cars than the larger Web page. Other considerations may include where the topic is found in the web page. For example, the word "car" appearing in the text of a web page may be less important than if the word car appears in some sort of title in the web page. How the word is used may also be of importance. For example, if the word "car" is in bold face or is italicized that may carry additional weight in terms of relevancy.

Figures 9A, 9B:
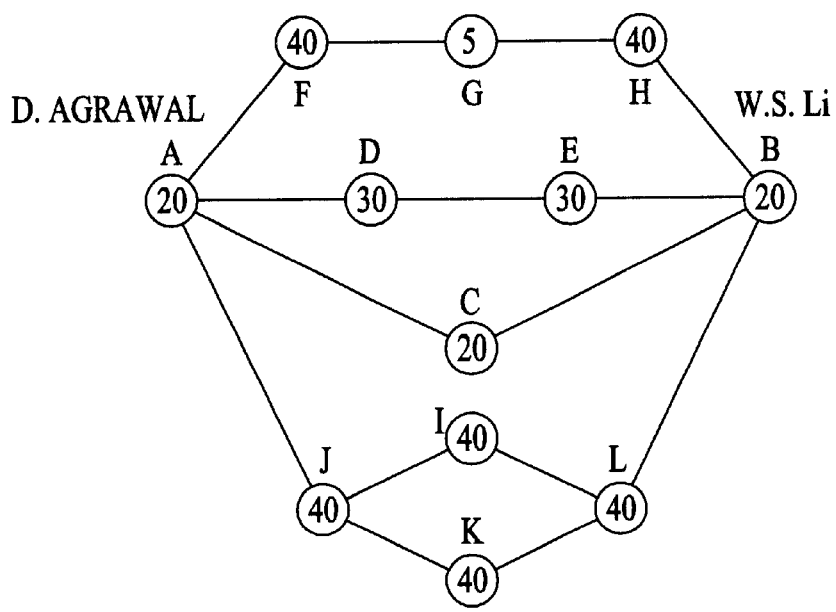
FIG. 9(a) is a graph illustrating the penalty values associated with all of the intermediate Web pages for moving between the two source pages in the example of FIG. 4, including the consideration of focused topics according to embodiments of the present invention.
FIG. 9(b) illustrates convergence vectors corresponding to the graph shown in FIG. 9(a) according to embodiments of the present invention.

Continuing the previous example for purposes of illustration only and referring to FIG. 9(a), assume that there is an interest in finding out why the W. S. Li Web page (vertex A) and the D. Agrawal Web page (vertex B) are associated with respect to P. Scheuermann. Also assume that the P. Scheuermann Web page (vertex G) has a strong relevance to the focused content, P. Scheuermann, and that the relevance function used assigns 0.8 to G and 0.1 to all other pages. Furthermore, assume that the following penalty function will be used:

$$\frac{penalty(v)}{relevance(v, topic)}.$$

FIG. 9(a) illustrates the corresponding graph and the associated vertex penalties. After the random walk graph and the transition matrix T is constructed, a convergence matrix t can be computed as shown in FIG. 9(b). According to the convergence vectors, the most "dominant" vertex in the graph is G. Comparing with the results in FIG. 8(b), the scores of G, F, and H are boosted due to the increased relevance of vertex G. Thus, the Topic-Focused Random Walk Algorithm reflects both the consideration of link structures and focused topics.

According to embodiments of the present invention, the more dominant convergence vectors generated by either of the random walk algorithms described above may be used for data mining or for the pre-fetching and refreshing of content.

User-Oriented Web Page Refresh and Pre-Fetch

The previously described methods identified Web pages having high association values with two or more seed pages for the purpose of data mining or pre-fetching of content. The random walk graphs constructed using the previously described methods assigned a penalty value to the edges or links between vertices (Web pages) based on the distances between the vertices, and also based on the relevance of the vertices.

Further embodiments of the present invention disclose a technique for determining which Web pages to pre-fetch or refresh that considers the current positions of one or more end-users navigating one or more Web sites. The technique is a variation of the proposed random walk algorithm, described above, in which the current positions of navigating end-users are the seed or source Web pages, and an end-user navigation history log maintained by a mirror server, proxy server, or the like is used to determined the penalty values for the edges (i.e. links for navigation). In general, the closer a Web page is to the current end-user navigation position, the less of a penalty value is assigned. However, in computing the penalty value, consideration of the second seed page is replaced by consideration of user and author preferences.

Given a pre-fetch bandwidth P and a set of objects to be pre-fetched O, embodiments of the present invention assign a priority $p_i$ to each object $o_i \in O$ such that, if the objects are pre-fetched to maximize the total priority, then the following is also maximized:

user satisfaction (e.g. more important objects got delivered first), customer (page owner) satisfaction (e.g. the page updated more often is pre-fetched more often), and the pre-fetched object utilization (e.g. how frequently a pre-fetched object is used).

Note that although the following discussion may refer to the pre-fetching of "objects" or "pages," the user of either term should be understood to include both the pre-fetching of the Web pages containing those objects, and the objects themselves.

User and Customer Satisfaction

User satisfaction can be captured by a user-object preference $u_i$ assigned to each object $o_i \in O$ based on the type/properties of the object (e.g., advertisement vs. news images). Customer/author satisfaction can be measured using a parameter $c_i$ assigned to each object $o_i$ in O based on the type/properties of the object (e.g., advertisement vs. news images).

Object Utilization

The pre-fetched object utilization can be captured by an object visualization probability. This probability indicates (1) the likelihood that a pre-fetched object will indeed be utilized (visualized to the user) before it expires, and (2) how soon it will be visualized. Therefore, to capture this information, the following information is needed:

the page relevance (because a relevant page is likely to be visualized), the distance from the end-user's current position to the page, described in terms of the number of links and the end-user's "stickiness" (the time that the end-user spends viewing the page), and the likelihood that the page will be updated before the end-user views the page (therefore rendering the pre-fetched objects useless). This value can be calculated using the update frequency and the object expiration time.

Techniques

For purposes of explanation, assume that there is a time frame $(t_o, t_o+\delta t)$ during which using the pre-fetch bandwidth, $p(t)=P$, a suitable subset of the objects in O will be pre-fetched. In addition, assume that the user preferences and the page author preferences are known. Thus, given an end-user u, let upref(u) denote the preferences of end-user u, and given a page author a, let apref(a) denote the corresponding set of page author preferences. It should be understood that upref(u) and apref(a) do not represent values, but rather represent a set of rules that define the user and author preferences.

Furthermore, the Web can be modeled as a directed graph G(V,E), where V corresponds to the Web pages and E corresponds to the links. Each v∈V is a pair $(O_v, a_v)$, where $O_v$ is a set of media objects (including the main HTML file) and $a_v$ is a page author. Each object o has a size, size(o), associated with it. It should be understood that given two vertices v1 and v2 in a graph G, $O_{v1} \cap O_{v2}$ is not necessarily empty. In other words, objects may be shared across pages. The list of pages that have a given object o is pages(o).

For the end-user u, a page preference weight pref(u,v) can be assigned to each vertex v in V. The value of pref(u,v) is calculated by applying the preference rules defined by upref(u), apref($a_v$) to the contents of $O_v$. Similarly, for each individual object $o \in O_v$, an object preference weight pref(u, o,v) can be calculated which combines user and author preferences as well as the object type and content.

Using the directed graph and the page preferences, a page gain gain(u,v) can be calculated for each page, where the page gain generally represents an association between the page and the current location of the end-user. The page gain can also be viewed as the end-user's satisfaction if the page is pre-fetched, or the likelihood that the end-user will visit that page, which are all measures of the level of association between the page and the current location of the end-user.

In preferred embodiments of the present invention, for each page v, gain(u,v) can be calculated using a random walk algorithm. Given a graph G(V,E) and a vertex $v_c$ corresponding to the current page p (the current location of the end-user), the random walk graph $G_w(V_w, E_w)$ can be generated as follows:

For each vertex $v_i$ in V, create a vertex $v_i'$ in $V_w$.

For each edge $e''_j = \langle v_a, v_b \rangle$ in E, create two edges $e'_j = (v'_a, v'_b)$ and $e''_j = \langle v'_b, v'_a \rangle$ and put them in $E_w$.

For each edge $e = \langle v_a, v_b \rangle \in E$, assign an edge weight w(e)= $s(u,v_s)$ to the edge. In preferred embodiments, $s(u,v_s)$ represents the end-user u's "stickiness" to the source vertex $v_s$ (the expected amount of time spend by the end-user u at page $v_s$). However, in alternative embodiments, the edge weight $s(u,v_s)$ may be approximated as a unit value, or may be assigned a larger value if the edge crosses a domain boundary.

Find the shortest distance from vertex $v_c$ to all vertices in V, where shortest($v_c$, $v_i$) denotes the shortest distance from $v_c$ to $V_i \in V$ (it should be understood that it is also possible to use earliest(u,$v_i$) (defined infra) instead of shortest($v_c$, $v_i$)). The shortest path may be identified, taking into the edge weight of each edge into account, by using a shortest path algorithm, well-understood by those skilled in the art.

For each vertex $v \in V_w$, calculate a penalty:

penalty(u,v)=shortest($v_c$, v)/(pref(u,v)+1).

for each vertex $v \in V_w$, calculate a unit probability unit(u,v) by solving the following equation:

$$\sum_{\langle v, v_j \rangle \in E_w} \frac{unit(u, v)}{penalty(u, v_i)} = 1;$$

where the unit probability unit(u,v) represents the probability of using an edge for each 1/penalty(u,$v_i$).

For each edge $e = \epsilon \langle v_j, v_j \rangle \in V_w$, calculate prob(u)($v_j | v_i$) as follows:

$$prob(u)(v_j | v_i) = \frac{unit(u, v_j)}{penalty(u, v_i)}.$$

Next, gain(u,v) may be calculated by finding the steady state distribution (convergence vector) of the random walk graph. Given a random walk graph $G_w(V_w, E_w)$, gain(u,v) is a convergence vector of T, where T is a matrix of transition values prob(u)($v_j | v_i$), and $$\sum_{1 \leq i \leq |V'_w|} gain(u, v) = 1.0.$$

Note that this convergence vector captures:
- the relevance of the pages to the end-user;
- the likelihood of an end-user visiting a particular page (connectivity); and
- how soon an end-user is likely to visit a page (the distance of each page from the end-user's current location).

Using the page gain gain(u,v), an object gain gain(u,o) can then be calculated for each object as $$gain(u, o) = \sum_{o \in O_v} gain(u, v) \times pref(u, o, v).$$

The cost of each object can also be defined as cost(o)=size(o).

Therefore, in order to maximize the benefit to user u, given a prefetch bandwidth $P_u$ and a prefetch duration δt, a suitable subset $O_s$ of O must satisfy the following criteria:

$$\sum_{o \in O_s} cost(o) \leq P_u \times \delta t, \text{ and}$$

$$\sum_{o \in O_s} gain(u, o) \text{ is maximized}.$$

The subset $O_s$, identified subject to the constraints defined above, produces a set of objects which may be pre-fetched based on the current location of a single end-user or seed page according to preferred embodiments of the present invention. However, it should be understood that in alternative embodiments, the algorithm defined above may be extended to multiple end-users or seed pages. Given a set of users U, an object gain gain(o) can be calculated for each object as $$gain(o) = \sum_{u \in U} \sum_{o \in O_v} gain(u, v) \times pref(u, o, v).$$

The cost of each object can again be defined as cost(o)=size(o).

In this case, in order to maximize the benefit to the set of users U, given a prefetch bandwidth $P_U$ and a prefetch duration δt, a suitable subset $O_s$ of O must satisfy the following criteria:

$\Sigma_{o \in O_s} cost(o) < P_U \times \delta t$, and $\Sigma_{o \in O_s} gain(o)$ is maximized.

In alternative embodiments of the present invention, if, for each object o, a value representing the earliest time that the object may be necessary (the earliest time to view, denoted earliest(u,o)) can be calculated, then those objects where expire(o)<earliest(u,o)

can be eliminated before $O_s$ is determined. It should be noted that when an object is delivered from a Web site to cache, a header called a meta-description or meta-data is delivered along with the object, which may include the expiration time expire(o) of that object.

Calculation of Gain and Estimation of the Earliest Time to View

In order to estimate earliest(u,o), the time at which a pre-fetched object, o, will first be useful, the time at which an end-user may access a page p that contains o must be estimated. This time depends on where the end-user u is currently located, how far p is from the end-user's current location, and how the end-user moves about in the Web space.

End-user movement patterns across the Web space can be modeled by page preferences, which describe the links that an end-user is likely to follow, and how long the end-user is likely to remain at each page:

Page stickiness, $s_o(u,v)$ and $s(u,v)$: The expected amount of time spent by user u at page v. This is a function of the relevance of the page to the user as well as the size and type of the page content. Also, the initial stickiness, $s_o(u,v)$ is larger than the revisit stickiness $s(u,v)$. Note that stickiness is a pre-defined user preference.

Stickiness may be important because a page that is going to be visited by an end-user for a long period of time (a high stickiness value) means that the next page to be accessed by that end-user may not be needed for a relatively long period of time. This means that the next Web page for that end-user need not be pre-fetched immediately. On the other hand, a page with a low stickiness value means that in a very short period time, the end-user is going to be moving on to the next page, and thus the Web page to be accessed next should be given a high pre-fetching priority. It should be understood, however, that while page stickiness may be relevant to determining which page should be pre-fetched next, it is not necessarily relevant to the importance of the Web page that is being viewed at that moment. This is due to the fact that it is not known why this page was viewed for so long. For example, it may just be that the person viewing the page took a break, or that the Web page is very cluttered or confusing.

Estimation of the Earliest Time to View

For each link $e=(v_s, v_d)$, where $v_s$ and $v_d$ are any two vertices in the graph G, an edge weight, $w(e)=s_o(u,v_s)$ can be assigned. Given a page $v_c$ where an end-user u is currently located, the earliest time that a page p may be accessed can be calculated as earliest(u,p)=shortest_path$_w(v_c, v_p)$.

Therefore, the earliest time an object o may be needed can be calculated as earliest(u,o)=min{earliest(u,p)|p∈pages(o)}.

Therefore, embodiments of the present invention provide a system and method employing random walks for mining web page associations and usage to optimize user-oriented web page refresh and pre-fetch scheduling that takes both link structure and Web page content into consideration. Embodiments of the present invention also provide a system and method employing random walks for mining web page associations and usage to optimize user-oriented web page refresh and pre-fetch scheduling that includes link analysis derived based on solving equations rather than using iteration-based methods. In addition, embodiments of the present invention provide a system and method employing random walks for mining web page associations and usage to optimize user-oriented web page refresh and pre-fetch scheduling that allows a set of Web pages to be specified to focus the reasoning.

What is claimed is:

1. On a computer network having a set of Web pages V and a set of links E between those Web pages represented as an undirected neighborhood graph $G^N(V^N, E^N)$, the computer network further including seed Web pages $v_a$ and $v_b$ in V, a method executable on the computer network for estimating associations between $v_a$ and $v_b$ and other Web pages $v_i \in V$, the method comprising the steps of:

constructing a directed random walk graph by
creating a new $v_i'$ in V for each $v_i \in V^N$, and creating two directed edges $e'_{2 \times k} = <v_i', v_j'>$ and $e'_{2 \times k-1} = <v_j', v_i'>$ in E for each $e_k = <v_i, v_j> \in E^N$ wherein both $v_i$ and $V_j$ are in $V^N$,
computing a penalty value penalty($v_i'$) for all vertices $v_i' \in V$, and
constructing a $|V| \times |V|$ transition matrix T, where T[j,i] represents a transition value for each directed edge in E denoting a likelihood of moving to vertex $v_i$ from vertex $v_j$; and
calculating a steady state distribution convergence vector t of T, wherein for each $v_i \in V$, t[i] represents the association between the seed Web pages and $v_i$.

2. A method as recited in claim 1, the step of computing a penalty value penalty($v_i'$) for all vertices $v_i' \in V$ comprising the steps of:

computing sdist($v_i', v_a'$) as a shortest distance in $G^N$ between $v_i'$ and the vertex $v_a'$ corresponding to $v_a$;
computing sdist($v_i', v_b'$) as the shortest distance in $G^N$ between $v_i'$ and the vertex $v_b'$ corresponding to $v_b$; and
computing the penalty value as penalty $(v_i')=$sdist($v_i', v_a'$)+sdist($v_i', v_b'$).

3. A method as recited in claim 2, the step of constructing a $|V| \times |V|$ transition matrix T comprising the steps of:

resetting T[j,i]=0.0 for all vertices $v_i' \in V$ and for all $(v_i', v_j') \notin E$; and
solving the following set of linear equations for all vertices $v_i' \in V$, $$L(v_i') = \left\{ \sum_{(v_i', v_j') \in \varepsilon} T[j, i] = 1.0 \right\} \cup$$

$$\{T[j, i] \times penalty(v_j') =$$

$$T[k, i] \times penalty(v_k') \mid (v_i', v_j') \in E \text{ and } (v_i', v_k') \in E\}.$$

4. A method as recited in claim 3, the step of calculating a steady state distribution (convergence vector) t of T comprising solving a linear equation (I−T)t=0, where I is a unit matrix, and $$\sum_{1 \leq i \leq |V_W|} t[i] = 1.0.$$

5. A method as recited in claim 2, the computer network further including a set of seed Web pages $|S| \geq 2$ in V, the step of computing a penalty value penalty($v_i'$) for all vertices $v_i' \in V$ comprising computing the penalty value as $$\text{penalty}(v_i') = \sum_{u_j \in S} \text{sdist}(v_i', v_j').$$

6. A method as recited in claim 2, the computer network further including a set of seed Web pages $|S| \geq 2$ in V, the step of computing a penalty value penalty($v_i'$) for all vertices $v_i' \in V$ comprising computing the penalty value as penalty($v_i'$)=length (minimum_steiner_tree($S \cup \{v_i'\}$)).

7. A method as recited in claim 6, further including the step of defining a relevant neighborhood of $G^N(V^N, E^N)$ for constructing the random walk graph as a set of vertices, $V^N = V_{G^U}(S, d)$, that are reachable either from the vertices in S in d edge traversals such that $$\forall v_l \in V_{G^u}(S, d) \bigvee_{v_j \in S} \text{reachable}_{G^u}(v_j, v_i, d).$$

8. A method as recited in claim 1, further including the step of defining a relevant neighborhood of $G^N(V^N, E^N)$ for constructing the random walk graph as a set of vertices, $V^N = V_{G^u}(v_a, v_b, d)$, that are reachable either from $v_a$ or $v_b$ in d edge traversals such that $\forall v_i \in V_{G^u}(v_a, v_b, d)$ reachable$_{G^u}(v_a, v_i, d) \vee$ reachable$_{G^u}(v_b, v_i, d)$.

9. A method as recited in claim 1, each Web page $v_i \in V$ having a known relevance value for a particular topic relevance(v,topic), the method further including the step of adjusting the penalty value penalty($v_i'$) for all vertices $v_i' \in V$ by dividing penalty($v_i'$) by relevance(v,topic).

10. A method as recited in claim 1, further including the step of pre-fetching Web pages into a memory in decreasing order of t[i].

11. On a computer network having a set of Web pages V and a set of links between those Web pages E modeled as a directed graph G(V,E), each Web page $v_i \in V$ comprising a pair $<O_v, a_v>$, where $O_v$ is a set of media objects including a main HTML file and $a_v$ is a page author, and where each object $o \in O_v$ has a known end-user preference upref(u) for an end-user u and a page author preference apref($a_v$) for a page author $a_v$, an end-user u accessing at a seed Web page $v_c$, a method executable on the computer network for estimating an association between the media objects and the seed Web page, the method comprising the steps of:

calculating a page preference weight pref(u,v) for each Web page $v_i$ by applying preference rules defined by upref(u) and apref($a_v$) to the contents of $O_v$;

calculating an object preference weight pref(u,o,v) for each object $o \in O_v$ by applying the preference rules defined by upref(u) and apref($a_v$) to the contents of $O_v$;

generating a random walk graph $G_w$ having a set of vertices $V_w$ and a set of edges $E_w$;

calculating a page gain gain(u,v) by finding a steady state distribution convergence vector of the random walk graph; and calculating an object gain gain(u,o) for each object as $$\text{gain}(u, o) = \sum_{o \in O_v} \text{gain}(u, v) \times \text{pref}(u, o, v),$$

wherein the object gain represents an association between the object and the seed Web page.

12. A method as recited in claim 11, the step of generating a random walk graph $G_w$ having a set of vertices $V_w$ and a set of edges $E_w$ comprising the steps of:

creating a vertex $v_i$ in $V_w$ for each Web page in V;

creating two edges $e'_j = <v'_a, v'_b>$ and $e''_j = <v'_b, v'_a>$ in $E_w$ for each edge $e_j = <v_a, v_b>$ in E; and assigning an edge weight w(e)=s(u, $v_j$) to each edge $e_j = <v_a, v_b>$ in E.

13. A method as recited in claim 12, wherein s(u,$v_j$) is a known stickiness value for each Web page $v_j \in V$.

14. A method as recited in claim 12, wherein s(u,$v_j$) is assigned a unit value for each edge $e_j = <v_a, v_b>$ in E.

15. A method as recited in claim 12, wherein s(u,$v_j$) is assigned a larger value than the unit value for each edge $e_j = <v_a, v_b>$ in E that crosses a domain boundary.

16. A method as recited in claim 12, the step of calculating a page gain gain(u,v) by finding a steady state distribution (convergence vector) of the random walk graph comprising the steps of:

finding a shortest distance shortest ($v_c$, $v_i$) from vertex $v_c$ to all vertices $v_i \in V$ while taking into account the edge weight using a shortest path algorithm;

for each vertex $v \in V_w$, calculating a penalty penalty(u,v)=shortest($v_c, v_i$)/(pref(u,v)+1), and calculating a unit probability unit(u,v) by solving $$\sum_{\langle v, v_i \rangle \in E_w} \frac{\text{unit}(u, v)}{\text{penalty}(u, v_i)} = 1;$$

calculating $$\text{prob}(u)(v_j \mid v_i) = \frac{\text{unit}(u, v_j)}{\text{penalty}(u, v_i)}$$

for each edge $e = \epsilon <v_i, v_j> \in V_w$; and calculating gain(u,v) by finding a steady state distribution (convergence vector) t of T, wherein for each $v_i \in V$, t[i] represents the association between the seed Web pages and $v_i$, where T is a matrix of transition values prob(u)($v_j | v_i$).

17. A method as recited in claim 16, the step of calculating gain(u,v) by finding a steady state distribution (convergence vector) t of T comprising solving a linear equation (I-T)t=0, where I is a unit matrix, and $\Sigma_{1 \leq i \leq |V_w|}$ gain(u,v)=1.0.

18. A method as recited in claim 17, wherein each object $o \in O_v$ has a known size size(o) and, having an available pre-fetch bandwidth $P_u$ and a pre-fetch duration $\delta t$ in which a server may pre-fetch objects into a memory, the method further includes the step of identifying a set of objects $O_s$ highly associated with the end-user or seed Web page, the step comprising:

defining a cost of each object as cost(o)=size(o); and
identifying a subset $O_s$ of $O_v$ such that $\Sigma_{o \in O_s}$ cost(o)$\leq P_u \times \delta t$ and $\Sigma_{o \in O_s}$ gain(u,o) is maximized.

19. A method as recited in claim 18, further including the step of pre-fetching or refreshing objects from $O_s$ into the memory.

20. A method as recited in claim 18, where each object $o \in O_v$ has a known expiration time expire(o), the method further including the step of refining the set of objects $O_s$ by removing those objects that will expire before their earliest time to view, the step comprising:
- finding a shortest path shortest_path($v_c, v_i$) from vertex $v_c$ to all vertices $v_i \epsilon V$ while taking into account the edge weight using a shortest path algorithm;
- calculating a measure of an earliest time that a page p may be accessed as earliest(u,p)=shortest_path($v_c, v_p$);
- calculating a measure of an earliest time that an object o may be needed as earliest(u,o)=min{earliest(u,p) |p$\epsilon$pages(o)}; and
- eliminating those objects from $O_v$ in which expire(o) <earliest(u,o) before identifying the set of objects $O_s$.

21. A method as recited in claim 17, wherein each object $o \in O_v$ has a known size size(o) and, having an available pre-fetch bandwidth $P_u$ and a pre-fetch duration $\delta t$ in which a server may pre-fetch objects into a memory, and given a set of users U or seed Web pages, the method further includes the step of identifying a set of objects $O_s$ highly associated with the set of users or seed Web pages, the step comprising:
- calculating an object gain gain(o) for each object as $$gain(o) = \sum_{u \in U} \sum_{o \in O_v} gain(u,v) \times pref(u,o,v),$$

wherein the object gain represents an association between the object and the set of end-users or seed Web pages;
- defining a cost of each object as cost(o)=size(o); and
- identifying a subset $O_s$ of $O_v$ such that $$\sum_{o \in O_s} cost(o) \leq P_U \times \delta t \text{ and } \sum_{o \in O_s} gain(o)$$

is maximized.

22. On a computer network having a set of Web pages V and a set of links E between those Web pages, a system for estimating associations between seed Web pages $v_a$ and $v_b$ and other Web pages $v_i \epsilon V$, comprising:
- memory for storing a location of the seed Web pages $v_a$ and $v_b$ and the other Web pages $v_i$ in V; and
- a processor programmed for modeling the computer network as an undirected neighborhood graph $G^N(V^N, E^N)$, and programmed for
  - constructing a directed random walk graph by
    - creating a new $v_i'$ in V for each $v_i \epsilon V^N$, and creating two directed edges $e'_{2 \times k}=<v_i', v_j'>$ and $e'_{2 \times k+1}=<v_j', v_i'>$ in E for each $e_k=<v_i, v_j> \epsilon E^N$ wherein both $v_i$ and $v_j$ are in $V^N$,
  - computing a penalty value penalty($v_i'$) for all vertices $v_i' \epsilon V$, and
  - constructing a $|V| \times |V|$ transition matrix T, where T[j,i] represents a transition value for each directed edge in E denoting a likelihood of moving to vertex $v_i$ from vertex $v_j$; and
  - calculating a steady state distribution convergence vector t of T, wherein for each v$\epsilon$V, t[i] represents the association between the seed Web pages and $V_i$.

23. A system as recited in claim 22, the processor further programmed for computing a penalty value penalty($v_i'$) for all vertices $v_i' \epsilon V$ by:
- computing sdist($v_i', v_a'$) as a shortest distance in $G^N$ between $v_i'$ and the vertex $v_a'$ corresponding to $v_a$;
- computing sdist($v_i', v_b'$) as the shortest distance in $G^N$ between $v_i'$ and the vertex $v_b'$ corresponding to $v_b$; and
- computing the penalty value as penalty($v_i'$)=sdist($v_i', v_a'$)+sdist($v_i', v_b'$).

24. A system as recited in claim 23, the processor further programmed for constructing a $|V| \times |V|$ transition matrix T by:
- resetting T[j,i]=0.0 for all vertices $v_i' \epsilon V$ and for all $(v_i', v_j') \notin E$; and
- solving the following set of linear equations for all vertices $v_i' \epsilon V$, $$L(v_i') = \left\{ \sum_{(v_i', v_j') \in \varepsilon} T[j,i] = 1.0 \right\} \cup$$

$$\{T[j,i] \times penalty(v_j') =$$

$$T[k,i] \times penalty(v_k') \mid (v_i', v_j') \in E \text{ and } (v_i', v_k') \in E\}.$$

25. A system as recited in claim 24, the processor further programmed for calculating a steady state distribution (convergence vector) t of T by solving a linear equation (I–T)t=0, where I is a unit matrix, and $$\sum_{1 \leq i \leq |v_W|} t[i] = 1.0.$$

26. A system as recited in claim 23, the computer network further including a set of seed Web pages $|S| \geq 2$ in V, the processor further programmed for computing a penalty value penalty($v_i'$) for all vertices $$v_i' \in V \text{ as } penalty(v_i') = \sum_{u_j \in S} sdist(v_i', v_j').$$

27. A system as recited in claim 23, the computer network further including a set of seed Web pages $|S| \geq 2$ in V, the processor further programmed for computing a penalty value penalty($v_i'$) for all vertices $v_i \epsilon V$ as penalty($v_i'$)=length(minimum_steiner_tree (S$\cup${$v_i'$})).

28. A system as recited in claim 27, the processor further programmed for defining a relevant neighborhood of $G^N(V^N, E^N)$ for constructing the random walk graph as a set of vertices, $V^N = V_{G^u}(S,d)$, that are reachable either from the vertices in S in d edge traversals such that $$\forall v_1 \in V_{G^u}(S,d) \bigvee_{v_j \in S} reachable_{G^u}(v_j, v_i, d).$$

29. A system as recited in claim 22, the processor further programmed for defining a relevant neighborhood of $G^N(V^N, E^N)$ for constructing the random walk graph as a set of vertices, $V^N = V_{G^u}(v_a, v_b, d)$, that are reachable either from $v_a$ or $v_b$ in d edge traversals such that $\forall v_i \epsilon V_{G^u}(v_a, v_b, d)$ reachable$_{G^u}(v_a, v_i, d) \vee$ reachable$_{G^u}(v_b, v_i, d)$.

30. A system as recited in claim 22, each Web page $v_i \epsilon V$ having a known relevance value for a particular topic relevance(v,topic), the processor further programmed for adjusting the penalty value penalty($v_i'$) for all vertices $v_i' \epsilon V$ by dividing penalty($v_i'$) by relevance(v,topic).

31. A system as recited in claim 22, the processor further programmed for pre-fetching Web pages into the memory in decreasing order of t[i].

32. On a computer network having a set of Web pages V and a set of links between those Web pages E, each Web page $v_i \epsilon V$ comprising a pair $<O_v, a_v>$, where $O_v$ is a set of media objects including a main HTML file and $a_v$ is a page author, a system for estimating an association between the media objects and a seed Web page $v_c$ corresponding to a current location of an end-user u, comprising:

memory for storing, for each object $o \epsilon O_v$, a known end-user preference upref(u) for the end-user u, a page author preference apref($a_v$) for the page author $a_v$, and a location of the seed Web page $v_c$; and a processor programmed for modeling the computer network as a directed graph G(V,E), and programmed for
   calculating a page preference weight pref(u,v) for an end user u for each Web page $v_i$ by applying preference rules defined by upref(u) and apref($a_v$) to the contents of $O_v$,
   calculating an object preference weight pref(u,o,v) for each object $o \epsilon O_v$ by applying the preference rules defined by upref(u) and apref($a_v$) to the contents of $O_v$,
   generating a random walk graph $G_w$ having a set of vertices $V_w$ and a set of edges $E_w$,
   calculating a page gain gain(u,v) by finding a steady state distribution convergence vector of the random walk graph, and
   calculating an object gain gain(u,o) for each object as $$gain(u, o) = \sum_{o \in O_v} gain(u, v) \times pref(u, o, v),$$

wherein the object gain represents an association between the object and the end-user or seed Web page.

33. A system as recited in claim 32, the processor further programmed for generating a random walk graph $G_w$ having a set of vertices $V_w$ and a set of edges $E_w$ by:
   creating a vertex $v_i$ in $V_w$ for each Web page in V;
   creating two edges $e'_j = <v'_a, v'_b>$ and $e''_j = <v'_b, v'_a>$ in $E_w$ for each edge $e_j = (v_a, v_b)$ in E; and
   assigning an edge weight w(e)=s(u,$v_j$) to each edge $e_j = <v_a, v_b>$ in E.

34. A system as recited in claim 33, wherein s(u,$v_j$) is a known stickiness value for each Web page $v_i \epsilon V$.

35. A system as recited in claim 33, wherein s(u,$v_j$) is assigned a unit value for each edge $e_j = <v_a, v_b>$ in E.

36. A system as recited in claim 33, wherein s(u,$v_j$) is assigned a larger value than the unit value for each edge $e_j = <v_a, v_b>$ in E that crosses a domain boundary.

37. A system as recited in claim 33, the processor further programmed for calculating a page gain gain(u,v) by finding a steady state distribution (convergence vector) of the random walk graph by:
   finding a shortest distance shortest ($v_c$, $v_i$) from vertex $v_c$ to all vertices $v_i \epsilon V$ while taking into account the edge weight using a shortest path algorithm;

for each vertex $v \epsilon V_w$,
   calculating a penalty penalty(u,v)=shortest($v_c, v_i$)/(pref(u,v)+1), and
   calculating a unit probability unit(u,v) by solving $$\sum_{(v,v_i) \in E_w} \frac{unit(u, v)}{penalty(u, v_i)} = 1;$$

calculating $$prob(u)(v_j | v_i) = \frac{unit(u, v_j)}{penalty(u, v_i)}$$

for each edge $e = \epsilon <v_i, v_j> \epsilon V_w$; and
   calculating gain(u,v) by finding a steady state distribution (convergence vector) of T, where T is a matrix of transition values prob(u)($v_j|v_i$), and $$\sum_{1 \le i \le |V_u|} gain(u, v) = 1.0.$$

38. A system as recited in claim 37, the processor further programmed for calculating gain(u,v) by finding a steady state distribution (convergence vector) t of T by solving a linear equation (I−T)t=0, where I is a unit matrix, and $$\sum_{1 \le i \le |V_u|} gain(u, v) = 1.0.$$

39. A system as recited in claim 38:
   the memory for storing a known size size(o) for each object $o \epsilon O_v$; and
   the processor having an available pre-fetch bandwidth $P_u$ and a pre-fetch duration δt for pre-fetching objects into a memory, and further programmed for identifying a set of objects $O_s$ highly associated with the end-user or seed Web page by
   defining a cost of each object as cost(o)=size(o), and
   identifying a subset $O_s$ of $O_v$ such that $\Sigma_{o \in O_s}$cost(o) $\le P_u \times \delta t$ and $\Sigma_{o \in O_s}$gain(u,o) is maximized.

40. A system as recited in claim 39, the processor further programmed for pre-fetching or refreshing objects from $O_s$ into the memory.

41. A system as recited in claim 39:
   the memory for storing a known expiration time expire(o) for each object $o \epsilon O_v$; and
   the processor further programmed for refining the set of objects $O_s$ by removing those objects that will expire before their earliest time to view by
   finding a shortest path shortest_path($v_c, v_i$) from vertex $v_c$ to all vertices $v_i \epsilon V$ while taking into account the edge weight using a shortest path algorithm,
   calculating a measure of an earliest time that a page p may be accessed as earliest(u,p)=shortest_path($v_c, v_p$), calculating a measure of an earliest time that an object o may be needed as earliest(u,o)=min{earliest(u,p) |p∈pages(o)}, and eliminating those objects from $O_v$ in which expire(o) <earliest(u,o) before identifying the set of objects $O_s$.

42. A system as recited in claim 38:

the memory for storing a known size size(o) for each object o∈$O_v$; and the processor having an available pre-fetch bandwidth $P_U$ and a pre-fetch duration δt in which a server may pre-fetch objects into a memory, and further programmed for identifying a set of objects $O_s$ highly associated with a set of users U or seed Web pages by calculating an object gain gain(o) for each object as $$gain(o) = \sum_{u \in U} \sum_{o \in O_v} gain(u, v) \times pref(u, o, v),$$

wherein the object gain represents an association between the object and the set of end-users or seed Web pages, defining a cost of each object as cost(o)=size(o), and identifying a subset $O_s$ of $O_v$ such that $$\sum_{o \in O_s} cost(o) \leq P_U \times \delta t \text{ and } \sum_{o \in O_s} gain(o) \text{ is maximized}$$

* * * * *